United States Patent [19]
Yamaguchi

[11] Patent Number: 5,823,282
[45] Date of Patent: Oct. 20, 1998

[54] HYBRID VEHICLE WITH OIL PUMP SELECTIVELY DRIVEN BY THE ENGINE, A GENERATOR OR A MOTOR

[75] Inventor: Kozo Yamaguchi, Aichi-ken, Japan

[73] Assignee: Kabushikikaisha Equos Research, Japan

[21] Appl. No.: 660,681

[22] Filed: Jun. 5, 1996

[30] Foreign Application Priority Data

Jun. 6, 1995 [JP] Japan ................................ 7-162959
Oct. 31, 1995 [JP] Japan ................................ 7-306652

[51] Int. Cl.$^6$ ........................... B60K 1/00; B60K 6/00
[52] U.S. Cl. ........................... 180/65.2; 180/65.3; 477/5; 60/714
[58] Field of Search ..................... 180/65.2, 65.3, 180/65.4, 65.6, 65.7, 69.6; 475/276; 477/5, 138; 123/2, 3; 60/713, 714, 716, 718

[56] References Cited

U.S. PATENT DOCUMENTS

| | | | |
|---|---|---|---|
| 4,042,056 | 8/1977 | Horwinski | 180/65 |
| 5,327,987 | 7/1994 | Abdelmalek | 180/65.4 X |
| 5,346,031 | 9/1994 | Gardner | 180/65.4 X |
| 5,415,603 | 5/1995 | Tuzuki et al. | 477/5 |
| 5,513,719 | 5/1996 | Moroto et al. | 180/65.6 X |
| 5,558,175 | 9/1996 | Sherman | 180/65.2 |

*Primary Examiner*—Robert J. Oberleitner
*Assistant Examiner*—Pamela J. Lipka
*Attorney, Agent, or Firm*—Lorusso & Loud

[57] ABSTRACT

A hybrid vehicle with control of the amount of discharge from an oil pump in accordance with the amount needed. The hybrid vehicle includes an oil pump (55) driven by a rotation from a secondary side (a carrier CR) of a one-way clutch (F1), an engine (11), a generator (16), and an output shaft (14) connected by a planetary gear unit (13). The one-way clutch (F1) is provided between the carrier (CR) of the planetary gear unit (13) and the engine (11). The rotation of the carrier (CR) via the planetary gear unit (13) is adjusted by controlling the generator (16) under command of a vehicle control unit (41), to appropriately adjust the amount of discharge from the oil pump (55) based on a detected running load.

21 Claims, 13 Drawing Sheets

HYBRID VEHICLE WITH OIL PUMP SELECTIVELY DRIVEN BY THE ENGINE, A GENERATOR OR A MOTOR

BACKGROUND OF THE INVENTION

1. Field of the Invention

This invention relates to a hybrid vehicle and, more particularly, to a hybrid vehicle having an oil pump provided with power by the rotation of an engine.

2. Description of the Related Art

Hybrid vehicles which have driving systems using both a fuel-fed conventional engine and a motor, have been proposed.

Various types of hybrid vehicles have been proposed, such as hybrid vehicles of the series (direct) type in which electric power generated by driving a generator, using the output rotation of an engine, is changed into direct current to charge a battery and electric power from the battery drives a drive motor, and hybrid vehicles of the parallel type in which the driving force of the engine and that of the motor are transmitted to the output shaft to drive the vehicle and the speed is mainly increased and decreased by controlling the output of the driving motor.

In the aforementioned hybrid vehicles of the series type, because the engine is separated from the drive train, the engine can be driven at its maximum efficiency.

In the hybrid vehicles of the parallel type, in which the engine generates torque and the electric motor generates an auxiliary torque, the ratio of mechanical energy converted into electric energy is small, so that the energy efficiency is high.

In the hybrid vehicles, as in vehicles provided with an ordinary automatic transmission, an oil pump is provided on the output shaft of the engine, and the oil pump is operated by an oil pump driving device. The oil pump, operated by the rotation from the engine, cools a frictional engagement element, and lubricates bearings, gears, the electric motor and so on.

However, in the aforementioned conventional hybrid vehicle, even when the engine is rotated at a low speed in, for example, an idling state, it is necessary to cool the frictional engagement element and to lubricate the bearings, gears, electric motor, and so forth; therefore, an oil pump with a large capacity is provided in order that a sufficient amount of oil can be supplied for such purposes.

When an oil pump with a large capacity is used and the engine is rotated at high speed in high speed drive, an excessive amount of oil is pumped and, therefore, energy consumption is increased corresponding to the excessive amount of oil pumped.

The capacity of an oil pump when determined by the engine speed of the vehicle in ordinary driving results in a shortage of the supply of lubricant. For example, when the vehicle runs at a high speed, or runs uphill, a larger amount of lubricant is needed to be supplied than needed under ordinary driving conditions, and the supply of lubricant runs short. Also, when severe driving conditions are detected, such as in starting abruptly, driving a differential gear system, and so on, a large supply of lubricant is needed.

Further, when a vehicle is started by the motor after the vehicle has been halted for a long time, the oil pump does not operate, so that each moving part is without a sufficient supply of lubricant, thereby decreasing durability.

In order to solve these problems, an oil pump with a variable capacity may be used, but there is a possibility that the mechanism becomes complicated.

It has also been proposed that a hybrid vehicle be provided with another (auxiliary) oil pump operated by an electric motor, in order that cooling and lubrication can be continued by the auxiliary oil pump even when the engine is halted. However, when an auxiliary oil pump is provided in the hybrid vehicle, the weight of the hybrid vehicle is increased by the weight of the auxiliary oil pump, resulting not only in poor fuel economy, but also in a higher cost corresponding to the increase in the size of the hybrid vehicle.

When two oil pumps are provided in a hybrid vehicle, their discharges need to be connected, so that the structure of the hybrid vehicle becomes more complicated. Further, a control device for operating each of the two oil pumps is necessary, representing a further cost.

SUMMARY OF THE INVENTION

Accordingly, an object of the present invention is to provide a hybrid vehicle capable of improved control of the amount of discharge of the oil pump.

In order to attain the aforementioned object, the present invention provides a hybrid vehicle which includes an internal-combustion engine, a generator operative at a rotational speed controlled based on an instruction signal, an electric motor driven by an electric current supplied thereto, an output shaft connected to the vehicle drive wheels, a differential gear unit consisting of at least three gear elements, with a first gear element connected to the generator, a second gear element connected to the internal-combustion engine, and a third gear element connected to the output shaft and to the electric motor, an oil pump for lubrication driven by an output shaft of the internal-combustion engine, a transmission shaft connected to the generator and to at least one of the first, second and third gear elements, and control means for controlling the amount of discharge from the oil pump by controlling the rotational speed of the generator.

A load detecting means for detecting a running load of the vehicle may be included and the control means may increase the rotational speed of the generator responsive to an increase in the detected running load. The running load detected by the load detecting means may be one of the vehicle speed, the degree of accelerator opening, the difference between the rotations of right and left wheels, or the motor temperature.

Further, vehicle start detecting means for detecting the stan of the vehicle may be included, and the control means may rotate the generator for a specified time responsive to detection of the start by the vehicle start detecting means.

The control means may rotate the generator when the vehicle is driven by the motor with the internal-combustion engine being halted.

A one-way clutch may be provided between the oil pump and the internal-combustion engine. A primary side member of the one-way clutch is connected to the output shaft of the internal-combustion engine and a secondary side member is connected to the aforementioned second gear element. A driving gear may be connected to the secondary member to drive the oil pump. The one-way clutch may lock when the secondary side member transmits the driving power of the internal-combustion engine and become free when the secondary member is to rotate in a reverse direction. Alternatively, the one-way clutch may lock when the generator connected to the aforementioned transmission shaft rotates in the direction in which the generator receives the reaction of the internal-combustion engine, and become free when the generator is about to rotate in a reverse direction.

The hybrid vehicle may further include selection means for selecting between at least two of the rotations of the aforementioned first, second, and third gear elements and for transmitting the selected rotational drive to the oil pump. This selection means may include a combination of a first one-way clutch and a second one-way clutch. The first one-way clutch and the second one-way clutch are connected to the input shaft of the oil pump, and the input shaft of the oil pump may be rotated by receiving the higher rotational speed from the selected first one-way clutch or the second one-way clutch. The selection means may have a first driving gear connected to the rotational shaft of the third gear element, a first driven gear which is connected to the input shaft of the oil pump and which is meshed with the aforementioned first driving gear, a second driving gear connected to the transmission shaft, and a second driven gear which is connected to the input shaft of the oil pump and which is meshed with the second driving gear. One of the aforementioned driving gears and the aforementioned driven gears may be connected to the rotational shaft of the second gear element, the input shaft of the oil pump, or the transmission shaft of the generator through one of the aforementioned one-way clutches, and the one one-way clutch may lock when the rotational speed of the generator is higher than the rotational speed of the input shaft of the oil pump.

The first one-way clutch may be connected to the first driving gear and the second one-way clutch may be connected to the second driving gear, whereby the faster of the rotation of the driving gear and the rotation of the aforementioned second driving gear may be transmitted to the input shaft of the oil pump.

Alternatively, the selection means may have the first driving gear connected to the rotational shaft of the third gear element, the first driven gear connected to the input shaft of the oil pump and meshed with the first driving gear, the second driving gear connected to the output shaft of the internal-combustion engine and the second driven gear connected to the input shaft of the oil pump and meshed with the second driving gear. One of the aforementioned driving gears and the aforementioned driven gears may be connected to the rotational shaft of the second gear element, the input shaft of the oil pump, or the transmission shaft of the generator through one of said one-way clutches, and the one one-way clutch may lock when the rotational speed of the second gear element or the rotational speed of the output shaft of the internal-combustion engine is higher than the rotational speed of the input shaft of the oil pump.

The first one-way clutch may be connected to the first driven gear while the second one-way clutch may be connected to the second driven gear, whereby the faster of the rotation of the first driven gear and the rotation of the second driven gear may be transmitted to the input shaft of the oil pump.

In the present invention, as described above, the hybrid vehicle includes the internal-combustion engine, the generator with its rotational speed controlled based on an instruction signal, the electric motor driven by an electric current supplied thereto, the output shaft connected to the drive wheels, the differential gear unit consisting of at least three gear elements, with the first gear element connected to the generator, the second gear element connected to the internal-combustion engine, and the third gear element connected to the output shaft and the electric motor. The oil pump for lubrication is driven by one of the output shaft of the internal-combustion engine and the transmission shaft connected to the generator. The control means controls the amount of discharge from the oil pump by controlling the rotational speed of the aforementioned generator.

DETAILED DESCRIPTION OF THE PREFERRED EMBODIMENT(S)

Figure 1:
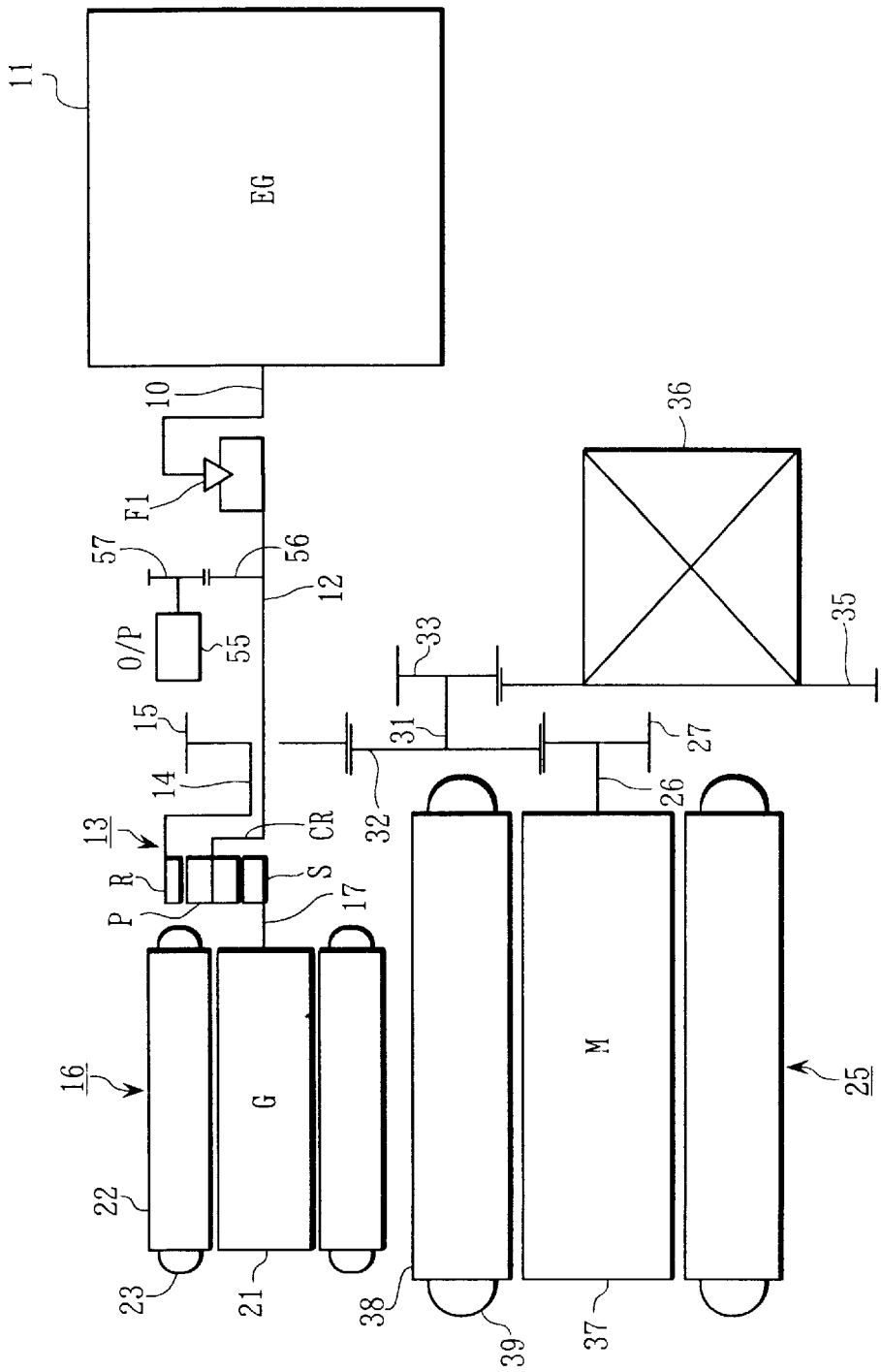
FIG. 1 is a block diagram showing the drive system of the hybrid vehicle in a first embodiment of the present invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Preferred embodiments of the present invention will now be described in detail with reference to the attached drawings.

The First Embodiment of the Drive System

FIG. 1 is a block diagram showing a drive system of a hybrid vehicle in the first embodiment of the present invention. As shown in FIG. 1 the drive train of the first embodiment includes an engine 11, a crank shaft 10 for outputting the rotation of the engine 11, an output shaft 12 to which the rotation of the crank shaft 10 is transmitted through a one-way clutch F1, a planetary gear unit 13 which is a differential gear unit for changing the speed of the rotation input through the output shaft 12, a unit output shaft 14 which receives rotation at the changed speed established by the planetary gear unit 13, a first counter drive gear 15 fixed to the unit output shaft 14, a generator 16 with a controllable rotational speed, and a transmission shaft 17 connecting the generator 16 and the planetary gear unit 13. The unit output shaft 14 has a sleeve shape and is mounted around the output shaft 12. The first counter drive gear 15 is positioned nearer the engine 11 than is the planetary gear unit 13.

The planetary gear unit 13 includes a sun gear S which is the first gear element, a pinion P engaging with the sun gear S, a ring gear R which is the second gear element engaging with the pinion P, and a carrier CR which is the third gear element rotatably supporting the pinion P.

The sun gear S is connected to the generator 16 by the transmission shaft 17, and the ring gear R is connected to the first counter drive gear 15 by the unit output shaft 14, while the carrier CR is connected to the engine 11 by the output shaft 12.

Further, the generator 16 is fixed to the transmission shaft 17 and includes a rotor 21, a stator 22 positioned around the rotor 21, and a coil 23 in the stator 22. The generator 16 generates electric power by the rotation transmitted through the transmission shaft 17. The aforementioned coil 23 is connected to a battery (not illustrated) and supplies and charges the battery with the electric power.

A driving motor 25 drives a motor output shaft 26 to which second counter drive gear 27 is fixed.

The driving motor 25 includes a rotor 37 which is free to rotate, a stator 38 positioned around the rotor 37, and a coil 39 coiled around the stator 38. The driving motor 25 generates torque by the electric current supplied to the coil 39. For this reason, the coil 39 is connected to a battery (not illustrated) so as to be supplied with electric current by the battery.

In the state of decreasing speed of the hybrid vehicle of the present invention, the driving motor 25 generates regenerative electric power by receiving the rotation from the driving wheels (not illustrated) and supplies and charges the battery with the regenerative electric power.

Then in order to rotate the driving wheels (not illustrated) in the same direction as the aforementioned engine 11 rotates, a countershaft 31 is provided as a driving output shaft to which is fixed a counter driven gear 32.

The counter driven gear 32 is meshed with the first counter drive gear 15, and the counter driven gear 32 is meshed with the second counter drive gear 27 so that the rotation of the first counter drive gear 15 and the rotation of the second counter drive gear 27 are the reverse of each other and are both transmitted to the counter driven gear 32.

Further, the countershaft 31 supports a dif-pinion gear 33 having a smaller number of teeth than does the counter driven gear 32.

A dif-ring gear 35 is meshed with the aforementioned dif-pinion gear 33 and supports a differential unit 36. The rotation transmitted to the dif-ring gear 35 is differentially rotated and transmitted to the driving wheels.

Accordingly, not only the rotation generated by the engine 11, but also the rotation generated by the driving motor 25 can be transmitted to the counter driven gear 32, whereby the hybrid vehicle can be driven in an engine drive mode in which only the engine 11 is driven, in a motor drive mode in which only the driving motor 25 is driven, and in an engine and motor drive mode in which the engine 11 and the driving motor 25 are both driven. As described in the following, by controlling electric power generated at the generator 16, the rotational speed of the aforementioned transmission shaft 17 can be controlled.

Selection Means—First Embodiment

The selection means includes a one-way clutch F1, and a drive gear 56 mounted on the output shaft 12. As described above, the one-way clutch F1 is positioned between the crankshaft 10 and the output shaft 12 with the primary side connected to the crankshaft 10 and the secondary side connected to the output shaft 12. That is, the primary side of the one-way clutch F1 is connected to the engine 11 and the secondary side is connected to the planetary gear unit 13. The one-way clutch F1 locks when the carrier CR is about to rotate in the direction in which the carrier CR receives the reaction of the engine 11 and the one-way clutch F1 becomes free when the carrier CR is about to rotate in a reverse direction. Accordingly, a member of the secondary side of the one-way clutch F1, that is, the carrier CR (the output shaft 12) rotates faster than the engine 11 (the crankshaft 10) in a normal direction, but does not rotate more slowly than the engine 11. A drive gear 56 is provided on the output shaft 12. Accordingly, when the rotation of the engine 11 is faster than the rotation of the carrier CR, the one-way clutch F1 is locked, and the rotation of the engine 11 is transmitted to the drive gear 56. When the rotation of the carrier CR is faster than the rotation of the engine 11, the one-way clutch F1 becomes free, and the rotation of the carrier CR is transmitted to the drive gear 56.

An input shaft of the oil pump 55 is connected to a driven gear 57 meshed with the aforementioned drive gear 56, so that the oil pump 55 is driven by the rotational power from the drive gear 56 through the driven gear 57.

That is, the faster of the rotation of the engine 11 and the rotation of the carrier CR is transmitted to the oil pump 55 through the selection means in the aforementioned design to drive the oil pump 55.

The Control System—First Embodiment

Figure 2:
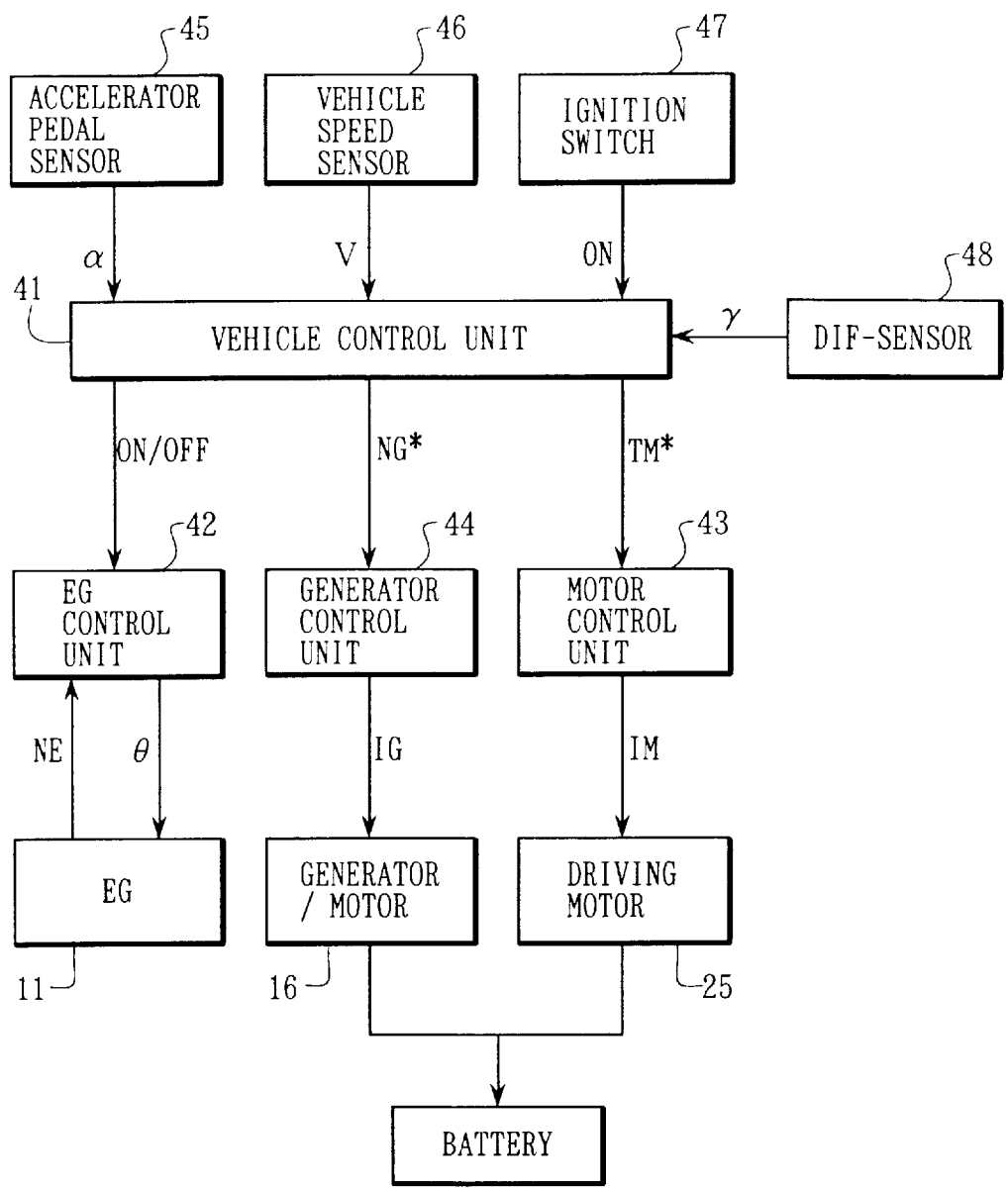
FIG. 2 is a block diagram of the control system of the hybrid vehicle in the first embodiment of the present invention.

FIG. 2 is a block diagram of the structure of the control system which is shown as including a vehicle control unit 41, an engine control unit 42, a motor control unit 43, and a generator control unit 44. This vehicle control unit 41 can be a micro computer provided with, for example, CPU (Central Processing Unit), a ROM (Read Only Memory) in which various kinds of programs and data are stored, and a RAM (Random Access Memory) used as a working area and so on.

Further, this control system includes an accelerator pedal sensor 45 for detecting the degree of accelerator opening α, a vehicle speed sensor 46 for detecting vehicle speed V, an ignition switch 47, and a dif-sensor 48 for detecting the rotational speeds of the right and left drive wheels which are output from the differential unit 36 and for determining the difference between those detected rotational speeds. Each detected value detected by each of the sensors 45, 46, and 48, and a signal showing that the ignition switch is turned ON are supplied to the vehicle control unit 41.

A running load detecting means is defined by the aforementioned accelerator pedal sensor 45, the vehicle speed sensor 46, and the dif-sensor 48.

The Vehicle Control Unit—First Embodiment

A vehicle control unit 41, which controls the overall operation of the hybrid vehicle, determines a torque TM* based on the degree of accelerator opening α from the accelerator pedal sensor and the vehicle speed V, and supplies the motor control unit 43 with this torque signal TM*.

The vehicle control system 41 supplies the engine control unit 42 with ON/OFF signals for the engine. More specifically, when the ignition key is turned ON, and the ON signal is output by the ignition sensor 47, the vehicle control unit 41 supplies the engine control unit 42 with the ON signal for the engine for driving the engine 11, and when the ignition key is turned OFF and the OFF signal is output by the ignition sensor 47, the vehicle control unit 41 supplies the engine control unit 42 with the OFF signal for the engine, thus halting the engine 11.

When a driver sets the mode as the motor driving mode or sets a back-up mode, the vehicle control unit 41 also supplies the engine control unit 42 with an OFF signal for halting the engine 11. Further, the vehicle control unit 41 controls the rotational speed of a drive gear 56 connected to the oil pump 55 so that the oil pump 55 discharges a required amount of oil. More specifically, the vehicle control unit 41 controls the rotational speed of the carrier CR, to which the drive gear 56 is connected, to provide a required speed through the planetary gear unit 13 by controlling the rotational speed of the generator 16.

Furthermore, the vehicle control unit 41 judges the degree of the load on each driving unit based on the input signal from each of the aforementioned sensors, determines a target rotational speed NG* for the generator 16 in order that the amount of discharge from the oil pump 55 is variable according to the degree of the load, and supplies the generator control unit 44 with the target rotational speed NG* as an instruction signal.

The Engine Control Unit—First Embodiment

The engine control unit 42 switches the state of the engine 11 between the driving state in which engine torque is output and the halted state, based on the selection instruction signal received inputted from the vehicle control unit 41, and controls the output of the engine 11 by controlling the degree of throttle opening θ in response to an engine speed signal NE received from the engine speed sensor.

The Motor Control Unit—First Embodiment

The motor control unit 43 controls the electric current (torque) IM in order that the Torque TM* is output from the driving motor 25.

The Generator Control Unit—First Embodiment

The generator control unit 44 controls the rotational speed NG of the generator 16 and controls the electric current (torque) IG to achieve a target rotational speed NG.

Operation of the Drive System—First Embodiment

Figure 3A:
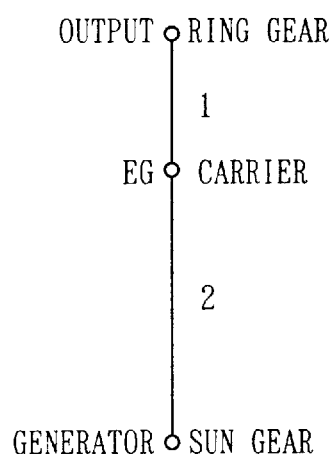
FIG. 3(A) is a schematic representation of the planetary gear unit in the first embodiment of the present invention.

As illustrated in FIG. 3(A), the number of teeth of the ring gear R of the planetary gear unit 13 is twice as many as those of the sun gear S. Accordingly, when the rotational speed of the unit output shaft 14 connected to the ring gear R (hereinafter referred to as "an output rotational speed") is NOUT, and the rotational speed of the output shaft 12 connected to the carrier CR (hereinafter referred to as "an engine speed") is NE, and the rotational speed of the transmission shaft 17 connected to the sun gear S (hereinafter referred to as "a generator rotational speed") is NG, the relationship among NOUT, NE, and NG is, as FIG. 3(B) depicts, $$NG = 3 \cdot NE - 2 \cdot NOUT.$$

Operation under Ordinary Driving Conditions—First Embodiment

Figure 4A:
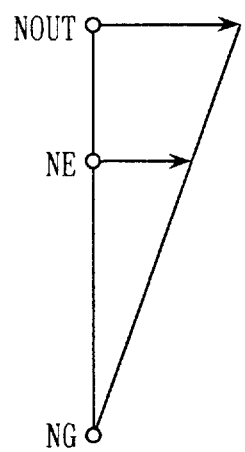
FIG. 4(A) is another speed diagram of the vehicle operating under ordinary driving conditions in the first embodiment of the present invention.

FIG. 4(A) is a speed diagram of the planetary gear unit 13 in ordinary driving conditions showing adjustment of the engine speed NE by controlling (halting) the generator rotational speed NG.

Figure 3B:
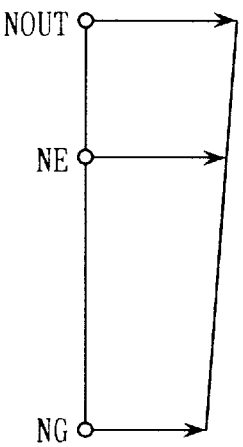
FIG. 3(B) is a speed diagram of the vehicle operating under ordinary driving conditions in the first embodiment of the present invention.

When the hybrid vehicle drives under ordinary conditions, the ring gear R, the carrier CR and the sun gear S are rotated in the normal direction, and as FIG. 3(B) depicts, the output rotational speed NOUT, the engine rotational speed NE, and the generator rotational speed NG have positive values. In this state, the engine speed NE is transmitted to the oil pump 55 through the selection means. When the output rotational speed NOUT is constant, the engine speed NE can be controlled by controlling the generator rotational speed NG as the difference between FIG. 4(A) and FIG. 3(B) shows, and accordingly in the state in which the output rotational speed NOUT is fixed, the rotational speed transmitted to the oil pump 55 can be adjusted.

When the running load is heavy and the amount of discharge from the oil pump 55 needs to be increased, the generator speed NG is increased. When the amount of discharge from the oil pump 55 is needed to decrease, the generator rotational speed NG is decreased.

Operation of the Vehicle in a Motor Driving Mode—First Embodiment

Figure 4B:
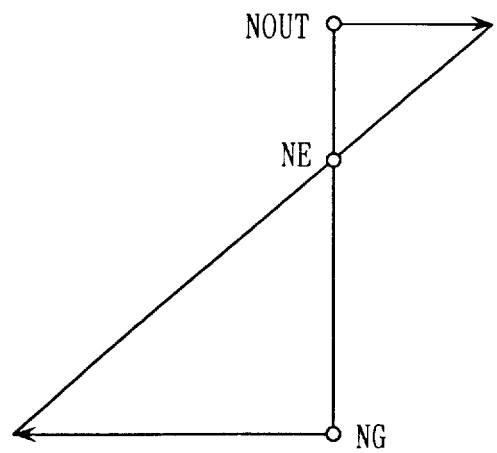
FIG. 4(B) is a speed diagram of a vehicle operating in a motor driving mode with a conventional drive system.
Figure 5:
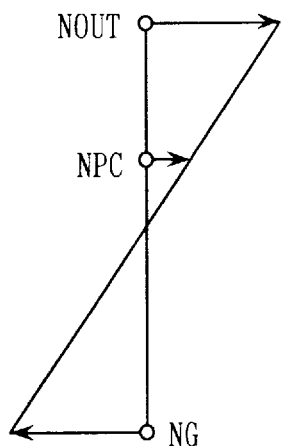
FIG. 5 is a speed diagram of the vehicle operating in a motor driving mode in the first embodiment of the present invention.
Figure 6:
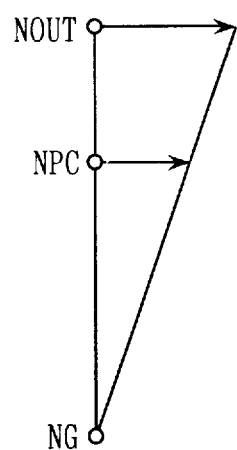
FIG. 6(A) is another speed diagram of the vehicle operating in a motor driving mode in the first embodiment of the present invention.
FIG. 6(B) is yet another speed diagram of the vehicle operating in a motor driving mode in the first embodiment of the present invention.
Figure 6:
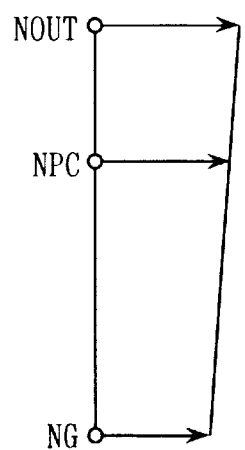

FIG. 4(B) is a speed diagram of the planetary gear unit 13 under ordinary driving conditions showing the state in which the engine 11 is halted in an embodiment in which the engine 11 and the carrier CR are directly connected. FIG. 5, FIG. 6(A) and FIG. 6(B) are speed diagrams of the planetary gear unit 13 operating under ordinary driving conditions in the present embodiment in which the engine 11 and the carrier CR are connected by the one-way clutch F1.

When the vehicle drives in a motor driving mode with the engine 11 halted and with only the driving motor 25 driven, in the embodiment in which the engine 11 and carrier CR are directly connected without the aforementioned one-way clutch F1, the engine speed of the engine 11 is zero as FIG. 4(B) depicts and, therefore, the oil pump is not driven.

In the case of the present embodiment including the selection means, the one-way clutch F1 becomes free, so that the carrier CR can rotate with the engine 11 being halted. Accordingly, when the rotational speed of the carrier CR is NPC, the carrier rotational speed NPC is transmitted to the oil pump 55 through the drive gear 56 provided at the output shaft 12 of the carrier CR. As FIG. 5, FIG. 6(A) and FIG. 6(B) depict, this carrier rotational speed NPC can be controlled by controlling the generator rotational speed NG and, accordingly, the rotational speed transmitted to the oil pump 55 can be adjusted with the output rotational speed NOUT being fixed.

When the load is light, the carrier CR can be rotated in a normal direction by decreasing the rotational speed NG to a value lower than that in FIG. 4 by controlling the generator, as FIG. 5 depicts. In this case, the generator 16 generates regenerative electric power and charges the battery 19 with electric power. The oil pump 55 is driven by the rotation of the carrier CR.

When the amount of discharge from the oil pump 55 needs to be increased, with an increasing load, the carrier rotational speed NPC is increased by controlling the rotational speed of the generator 16 to have the generator rotational speed NG at zero, as FIG. 6(A) depicts. Then the rotational speed transmitted to the oil pump 55 increases and the amount of discharge from the oil pump 55 increases.

When the amount of discharge from the oil pump 55 is needed to be further increased with the load further increasing, the generator rotational speed NG in a normal direction is increased by driving the generator 16 as a motor as FIG. 6(B) depicts. Then, the rotational speed transmitted to the oil pump 55 further increases, and the discharge from the oil pump 55 likewise increases.

Operation When the Vehicle Is Halted—First Embodiment

Figure 7A:
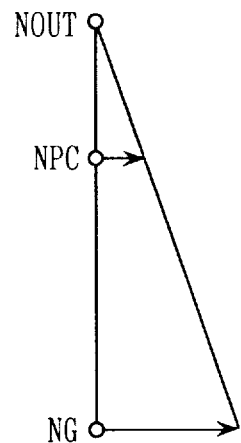
FIG. 7(A) is a speed diagram illustrating starting the engine in the first embodiment of the present invention.

FIG. 7(A) is a speed diagram of the planetary gear unit 13 when the engine is started by the starter after the vehicle has been halted for a long time.

When the vehicle has been halted for a long time, insufficient lubricant has been supplied to the bearings and differential unit 36, so that it becomes necessary to quickly supply sufficient lubricant to each part. In other words, when the vehicle has been halted for a long time, the oil pump 55 must be driven so that the amount of discharge is increased.

FIG. 7(A) depicts a speed diagram of the planetary gear unit 13 in the aforementioned case. When the ignition is turned on after the vehicle has been halted for a long time, the generator 16 is driven as a motor, and the carrier rotational speed NPC is adjusted in order that the oil pump 55 discharges the required amount of oil. In this case, since the one-way clutch F1 is free, the lubricant can be supplied to each part with the engine 11 being halted.

Operation with the Vehicle in Reverse in a Motor Driving Mode—First Embodiment

Figure 7B:
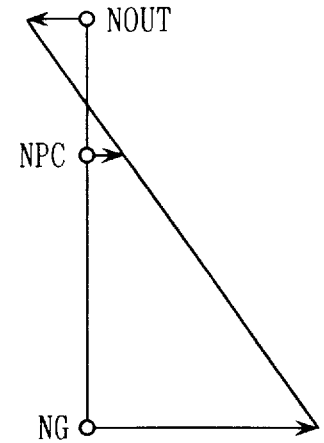
FIG. 7(B) is a speed diagram of the vehicle illustrating reverse driving in the first embodiment of the present invention.

FIG. 7(B) is a speed diagram of the planetary gear unit 13 when the vehicle reverses in a motor driving mode. In the case of reversing, the output rotational speed NOUT in a reverse direction is input to the ring gear R. As FIG. 7(B) depicts, by increasing the generator rotational speed NG in a normal direction by controlling the generator 16, the carrier CR can be rotated in a normal direction and the carrier rotational speed NPC can be increased. Accordingly the oil pump 55 can be driven, and the amount of discharge from the oil pump 55 can be adjusted by controlling the generator rotational speed NG. In this case, the one-way clutch F1 is free and, therefore, the lubricant can be supplied to each part with the engine 11 being halted.

Operation of the Control System—First Embodiment

Figure 8:
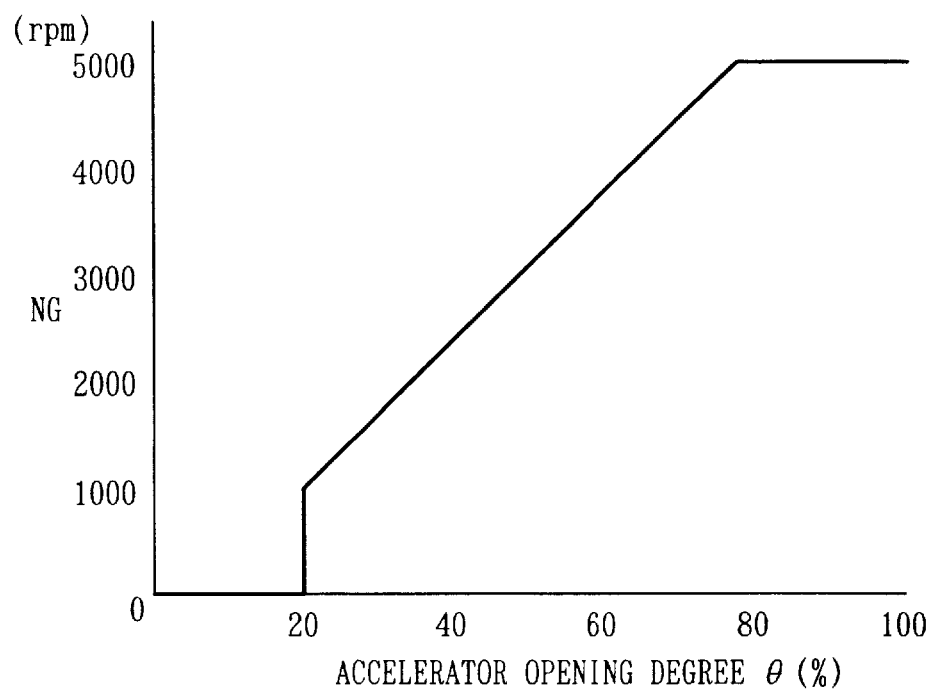
FIG. 8 is a map showing the relationship between the degree of accelerator opening and the generator rotational speed.
Figure 9:
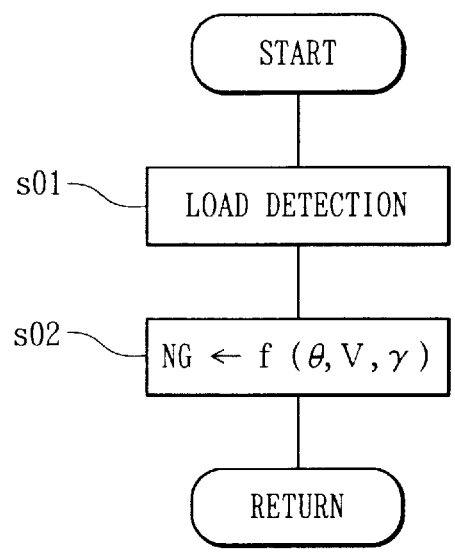
FIG. 9 is a flowchart of the control routine executed by the control system.

The routine for controlling the amount of discharge from the oil pump 55 by the vehicle control unit 41 will now be described with reference to FIGS. 8 and 9. FIG. 8 is a map showing the relationship between the degree of accelerator opening θ and the generator rotational speed NG, and FIG. 9 is a flow chart showing the routine for controlling the amount of discharge from the oil pump 55.

Operation When a Load Is Added While the Vehicle Is Operating Under Ordinary Conditions—First Embodiment When a load is added by running uphill, by abruptly increasing speed, and so on, the amount of the load is determined by the degree of accelerator opening θ. The vehicle control unit 41 detects the degree of accelerator opening θ by use of the accelerator pedal sensor 45 (step S01), determines the generator rotational speed NG based on the map shown in FIG. 8, and supplies the generator rotational speed NG to the generator control unit 44 (step S02). The aforementioned operation is repeated while the vehicle is running.

When the vehicle drives at high speed, the drive system drives at high speed even if the degree of accelerator opening θ is small and, therefore it is necessary to increase the supply of lubricant compared to the case in ordinary driving. For this, the vehicle speed V is detected by the vehicle speed sensor 46, and the generator rotational speed NG is determined in accordance with the vehicle speed V, based on the predetermined map, in the same way as in the case of detection of the degree of accelerator opening θ. In another control operation, a fixed threshold value is set for the vehicle speed V, and when the vehicle speed reaches the threshold value, the generator rotational speed NG is increased.

Likewise, when the difference between the rotational speeds of the right and left driving wheels output from the differential unit 36 is large, it is necessary to increase the amount of the lubricant supplied to the differential unit 36. For this, the difference between the rotational speeds of the right and left driving wheels y is detected by the dif-sensor 48, and the generator rotational speed NG is controlled to correspond to the rotational speed difference γ, determined based on the predetermined route map, in the same way as in the case of detection of the degree of accelerator opening θ.

The aforementioned operation is also conducted when the vehicle runs in reverse.

Operation When the Vehicle Is Halted—First Embodiment

Figure 10:
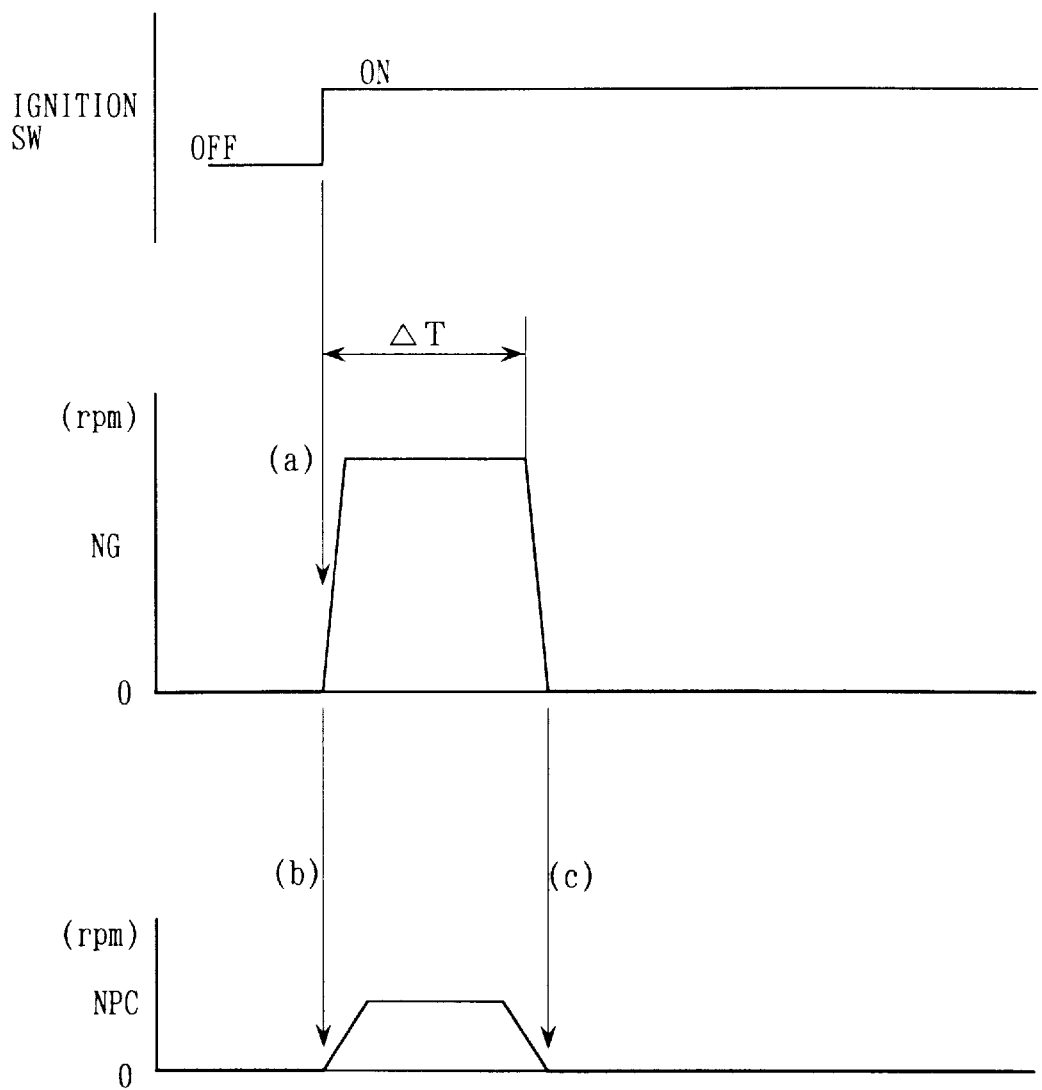
FIG. 10 is a time chart showing the control operation of the control system.

FIG. 10 is a time chart showing the operation controlling the amount of discharge from the oil pump 55 by the vehicle control unit 41 when the vehicle is started in motion. When the vehicle is started in motion after the vehicle has been halted for a long time, it is necessary to supply lubricant to each part of the drive system at an early point in time and, therefore, the following control operation is conducted.

When the ON signal from the ignition switch is received, the vehicle control unit 41 determines the generator rotational speed NG at which the oil pump 55 will discharge a sufficient amount of oil when the vehicle is started, and supplies the aforementioned determined generator rotational speed NG1 to the generator control unit 44. When the generator rotates at NG1 (position (a) in FIG. 10), the rotation is transmitted through the planetary gear unit 13 and the carrier CR rotates at NPC1 (position (b) in FIG. 10). By this rotation of the carrier CR, the rotation is transmitted from the drive gear 56 to the oil pump 55.

After the vehicle control unit 41 rotates the generator 16 at the rotational speed of NG1 for a specified time ΔT, the vehicle control unit 41 returns the generator 16 to the original state. Following this, the rotational speed of the carrier CR becomes zero. By driving the oil pump 55 for the time ΔT, a sufficient amount of lubricant for starting the vehicle in motion is supplied to each part.

The first embodiment is described in the above, and in the embodiment shown in FIG. 1, the one-way clutch F1 is positioned between the crankshaft 10 and the output shaft 12; however, this one-way clutch may be eliminated. In this case, the engine is also rotated and a large amount of energy is consumed if the lubrication is continuous and, accordingly, the lubrication may be intermittent.

Drive System—Second Embodiment

Figure 11:
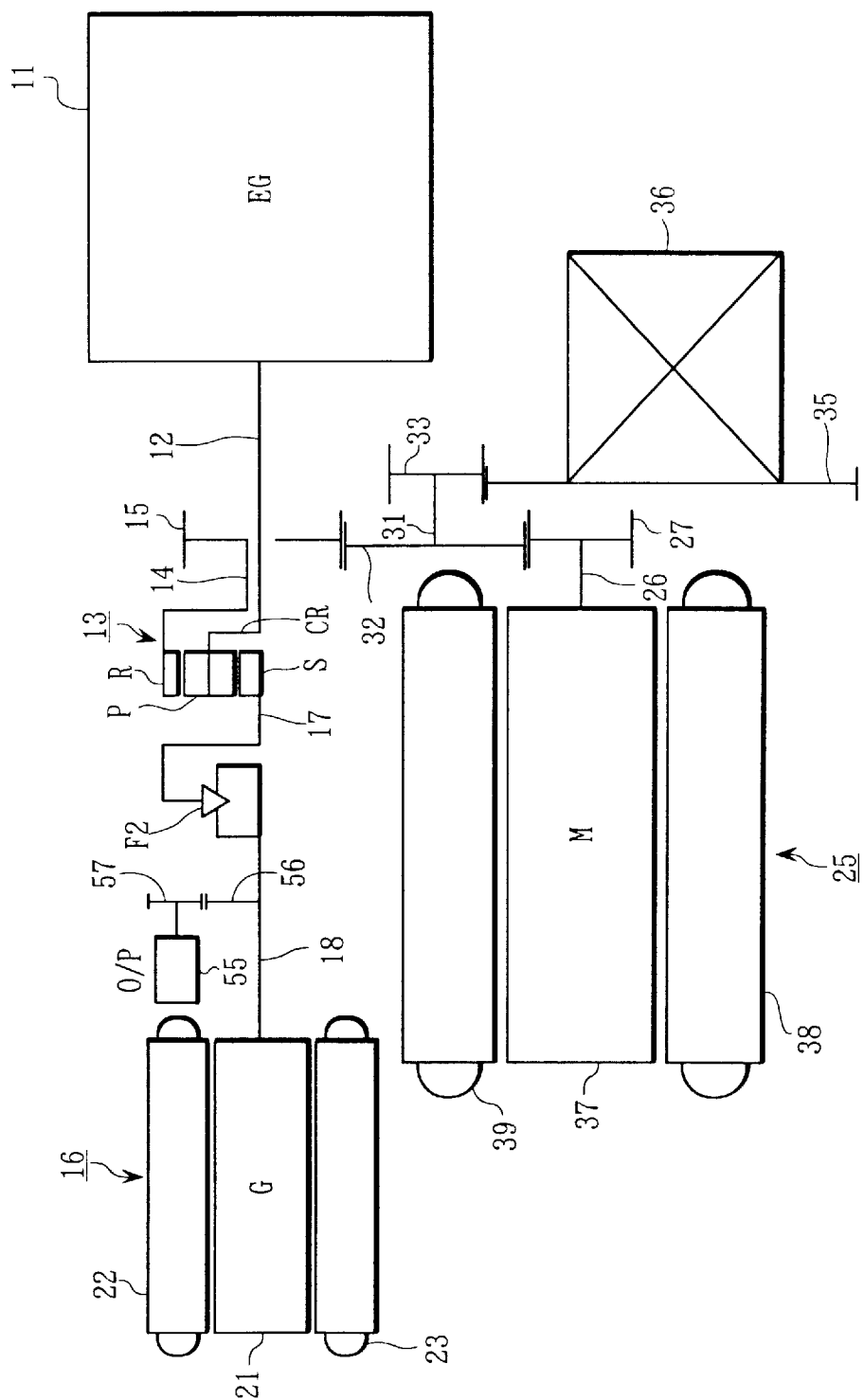
FIG. 11 is a block diagram of a drive system in a second embodiment of the present invention.

The hybrid vehicle of the second embodiment of the present invention will be described based on FIG. 11. In the drive system of the second embodiment, a one-way clutch F2 is positioned between the planetary gear unit 13 and the generator 16, and a primary side of the one-way clutch F2 is linked to the transmission shaft 17 connected to the sun gear S, and a secondary side of the one-way clutch F2 is linked to a rotor shaft 18 of the generator 16. The one-way clutch F2 locks in the direction in which the rotor 18 receives the reaction of the engine 11, and becomes free in a reverse direction.

Accordingly, the selection means in this second embodiment includes the aforementioned one-way clutch F2 and the drive gear 56 provided on the rotor shaft 18 which is at the secondary side of the one-way clutch F2. The generator 16 rotates in a normal direction faster than the sun gear S, but does not rotate more slowly than the sun gear S.

When the rotation of the sun gear S is faster than the rotation of the rotor shaft 18, the one-way clutch F2 is locked, and the rotation of the sun gear S is transmitted to the drive gear 56. When the rotation of the rotor shaft 18 is faster than the rotation of the sun gear S, the one-way clutch F2 becomes free, and the rotation of the generator 16 is transmitted to the drive gear 56.

The remaining structure of this second embodiment is the same as the structure in the aforementioned first embodiment.

The control system in this second embodiment is the same as that in the aforementioned first embodiment. The rotation of the generator 16 is directly transmitted to the oil pump 55 through the drive gear 56 and the driven gear 57, so that the rotational speed of the oil pump 55 is proportional to the rotational speed of the generator 16.

Operation of the Vehicle in Ordinary Driving—Second Embodiment

Figure 12:
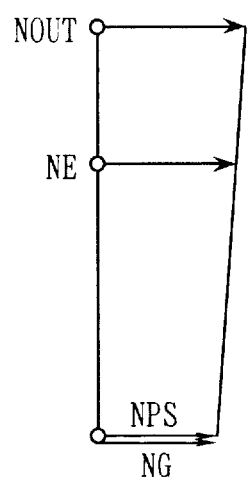
FIG. 12(A) is a speed diagram of the vehicle operating under ordinary driving conditions in the second embodiment of the present invention.
FIG. 12(B) is another speed diagram of the vehicle operating under ordinary driving conditions in the second embodiment of the present invention.
Figure 12:
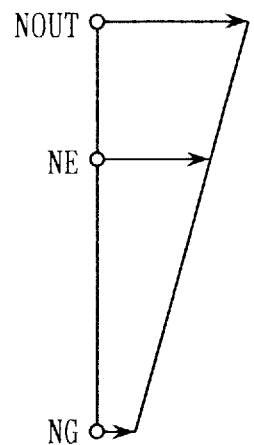

When the hybrid vehicle drives under ordinary conditions, the ring gear R, the carrier CR, and the sun gear S are rotated in a normal direction, and as shown in FIG. 12(A), the output rotational speed NOUT, the engine rotational speed NE, and the generator rotational speed NG have positive values. In this state, the one-way clutch F2 is locked and the rotational speed NG of the generator 16 (sun gear S) is transmitted to the oil pump 55 through the selection means. At the same output rotational speed NOUT, the rotation transmitted to the oil pump 55 can be adjusted when the output rotational speed NOUT is fixed by controlling the generator rotational speed NG as shown in FIG. 12(B).

When the load is heavy and the amount of discharge from the oil pump 55 must be increased, the generator rotational speed NG is increased as shown in FIG. 12(A). When the amount of discharge from the oil pump 55 needs to be decreased, the generator rotational speed NG is decreased as shown in FIG. 12(B).

Operation of the Vehicle in a Motor Driving Mode—Second Embodiment

Figure 13:
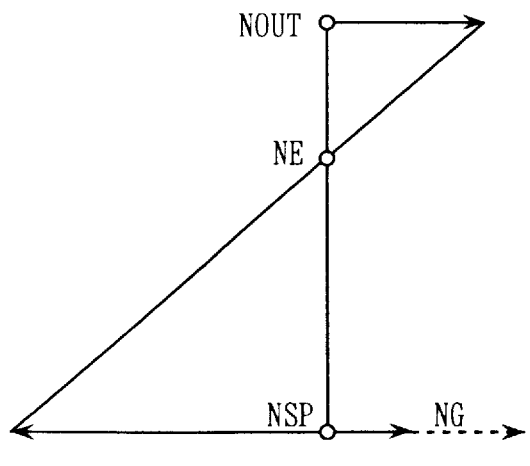
FIG. 13(A) is a speed diagram of the vehicle operating in a motor driving mode in the second embodiment of the present invention.
FIG. 13(B) is a speed diagram illustrating starting the engine in the second embodiment of the present invention.
Figure 13:
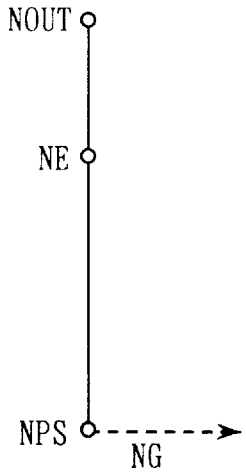

FIG. 13(A) is a speed diagram of the planetary gear unit 13 under ordinary driving conditions with the vehicle of the present second embodiment in which the sun gear S and the generator 16 are connected through the one-way clutch F2.

When the vehicle drives in a motor driving mode in which the vehicle runs by power of only the driving motor 25, with the engine 11 being halted, the sun gear S rotates in a reverse direction. However, the one-way clutch F2 becomes free and, therefore, the generator 16 can be rotated in a normal direction independently of the rotation of the sun gear S. Accordingly, when the rotational speed of the sun gear S is NPS, the generator rotational speed NG can be controlled to be in a normal rotational direction even if the sun gear rotational speed NPC is in a reverse rotational direction, as shown in FIG. 13(A). The generator rotational speed NG is transmitted to the oil pump 55 through the drive gear 56 provided on the rotor shaft 18. That is to say, the rotational speed of the oil pump 55 is directly adjusted by controlling the generator rotational speed NG.

In other words, when the load is light, the amount of discharge from the oil pump 55 can be decreased by decreasing the generator rotational speed NG as shown by a solid line in FIG. 13(A). When the load is heavy, the amount of discharge from the oil pump 55 can be increased by increasing the generator rotational speed NG as shown by a chain line in FIG. 13(A).

Operation When the Vehicle is Halted—Second Embodiment

When the vehicle is halted and the engine 11 is also halted, the sun gear S is also halted as shown in FIG. 13(B). When the vehicle has been halted for a long time, it is necessary to supply sufficient lubricant to each part, so that the generator rotational speed NG is increased in order to increase the amount of discharge of the oil pump 55. At this time, the one-way clutch F2 becomes free and the generator 16 rotates faster than the sun gear S as shown in FIG. 13(B).

Operation of the Vehicle in Reverse in a Motor Driving Mode—Second Embodiment

When the vehicle reverses, the output rotational speed NOUT in a reverse direction is input to the ring gear R. Since the engine 11 is halted, the sun gear S is rotated in a normal direction. At this time the one-way clutch F2 is locked, and the rotation of the sun gear S is transmitted to the rotor shaft 18. As shown by the solid line in FIG. 14, the oil pump 55 is driven by the rotation of this rotor shaft 18 (NPS).

Figure 14:
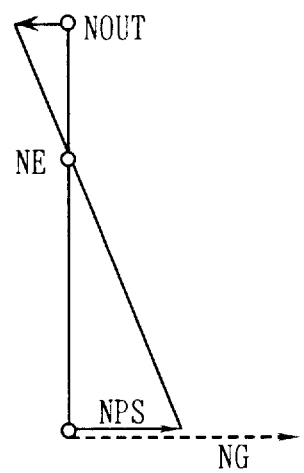
FIG. 14 is a speed diagram of the vehicle illustrating reverse driving in the second embodiment of the present invention.

When a load is added while the vehicle is in reverse and the amount of discharge of the oil pump 55 needs to be increased, the amount of discharge from the oil pump 55 can be increased by increasing the generator rotational speed NG to be higher than the sun gear rotational speed NPC by driving the generator 16 in a normal direction as shown by the chain line in FIG. 14.

The Control System and its Operation—Second Embodiment

The description of the control system of this second embodiment is abbreviated by incorporation of the description of the first embodiment since the control system is the same as that in the first embodiment. However, the generator rotational speed NG in the first embodiment, which is transmitted to the drive gear 56 through the planetary gear unit 13, has a different transmission ratio when the generator rotational speed NG is transmitted from the generator 16 to the drive gear 56, compared to the generator rotational speed NG in the second embodiment which directly becomes the rotational speed of the drive gear 56. Accordingly, in the second embodiment, the amount of the generator rotational speed NG which is changed in order to adjust the amount of discharge from the oil pump 55 is different from that in the first embodiment.

For example, when the vehicle drives under ordinary conditions and the amount of discharge from the oil pump 55 is adjusted, a given change in the amount of discharge can be effected in the second embodiment by a smaller change of the generator rotational speed NG, compared to the first embodiment.

Third Embodiment

Figure 15:
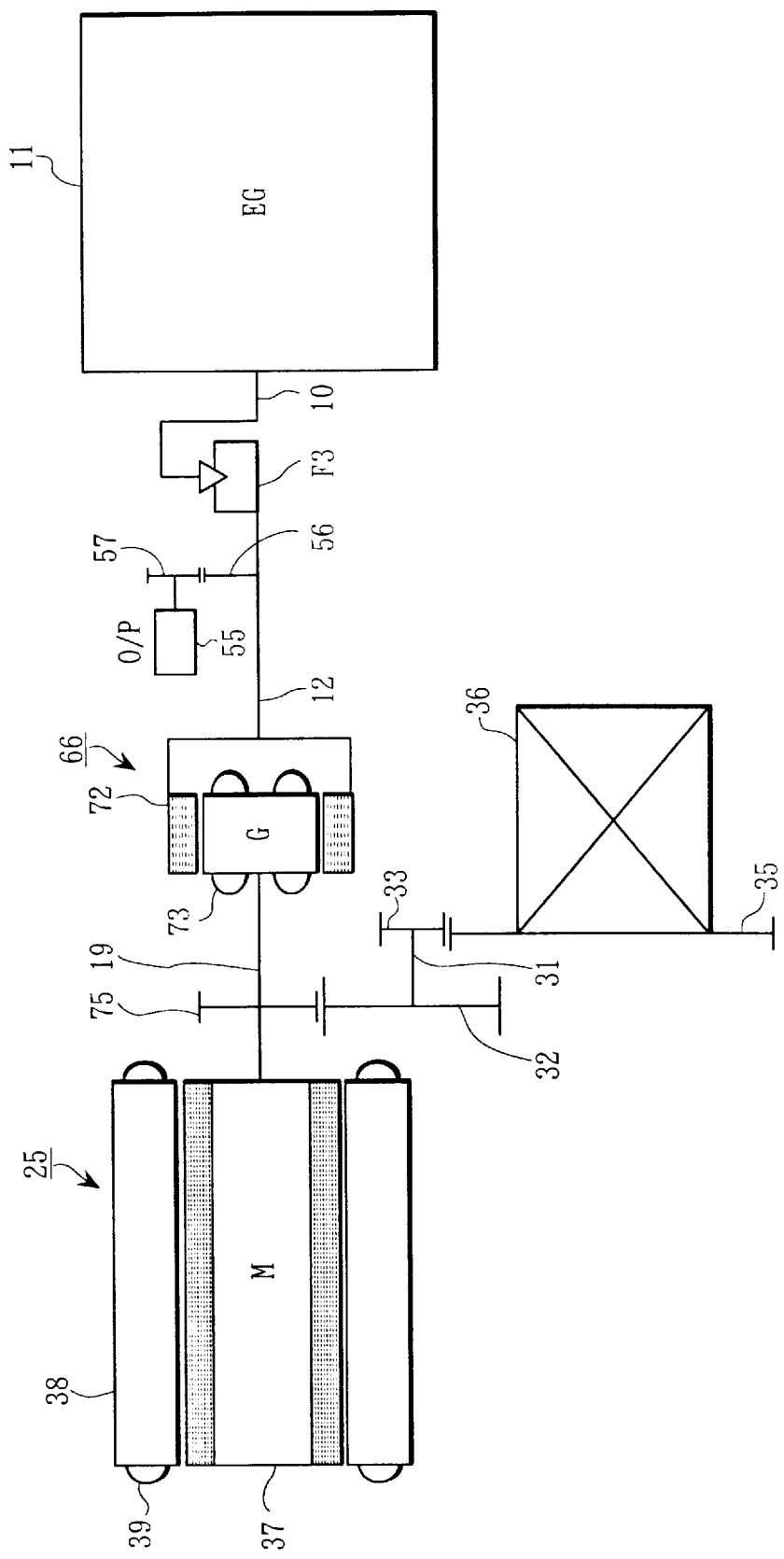
FIG. 15 is a block diagram showing the drive system in the third embodiment of the present invention.

FIG. 15 is a block diagram of the structure of the drive system in the third embodiment. The drive system of this embodiment includes the engine (EG) 11, the crankshaft 10 of the engine 11, the output shaft 12 to which the rotation of the crankshaft is transmitted through a one-way clutch F3, a generator (G) 66 linked to the output shaft 12, a transmission shaft 19 of which one end is linked to a rotor 71 of the generator 66, the driving motor (M) 25 linked to the other end of the transmission shaft 19, and a counter drive gear 75 provided on the transmission shaft 19.

The generator 66 includes the rotor 71 which freely rotates, a stator 72 provided around the rotor 71 which also freely rotates, and a coil 73 coiled at the stator. This generator 66 generates electric power by the rotation transmitted through the output shaft 12. The aforementioned coil 73 is connected to a battery (not illustrated) and the electric power is supplied to and charged in the battery.

The description of the driving motor 25, which is the same as in the first embodiment, is abbreviated by incorporation of the description of the first embodiment. When the hybrid vehicle decreases its speed, the driving motor 25 generates regenerative electric power by the rotation from the driving wheels (not illustrated), and this regenerative electric power is supplied to and charged in the battery (not illustrated).

Further, in the drive system of this third embodiment, the counter shaft 31 is provided in order to rotate drive wheels in the same direction as the engine 11 rotates, and the counter driven gear 32 is fixed to the counter shaft 31. On the counter shaft 31 is fixed the dif-pinion gear 33 having a smaller number of teeth than that of the counter driven gear 32.

The dif-ring gear 35 is meshed with the dif-pinion gear 33, and the dif-ring gear 35 is fixed to the differential unit 36. The rotation transmitted to the dif-ring gear 35 is differentially rotated by the differential unit 36 and transmitted to the drive wheels.

The selection means in this third embodiment includes a one-way clutch F3, and the driving gear 56 provided on the output shaft 12. The one-way clutch F3 is positioned between the crankshaft 10 and the output shaft 12 as described above, and the primary side is connected to the crankshaft 10 while the secondary side is connected to the output shaft 12. In other words, the primary side of the one-way clutch F3 is linked to the engine 11 and the secondary side is linked to the generator 66. The one-way clutch F3 locks when the stator 72 is about to rotate in the direction in which the stator 72 receives the reaction of the engine 11, and becomes free when the stator 72 is about to rotate in a reverse direction.

Accordingly, the member at the secondary side of the one-way clutch F3, that is, the stator 72 (the output shaft 12) rotates in a normal direction faster than the engine 11 (the crankshaft 10) linked to the member at the primary side, but the stator 72 does not rotate more slowly than the engine 11. The driving gear 56 is provided on the output shaft 12. Accordingly, when the rotation of the engine 11 is faster than the rotation of the stator 72, the one-way clutch F3 is locked, and the rotation of the engine 11 is transmitted to the driving gear 56. When the rotation of the stator 72 is faster than the rotation of the engine 11, the one-way clutch F3 becomes free, and the rotation of the stator 72 is transmitted to the driving gear 56.

The input shaft of the oil pump 55 is linked to a driven gear 57 meshed with the aforementioned driving gear 56, and the oil pump 55 is arranged so as to be driven by the rotation from the driving gear 56 transmitted by the driven gear 57.

The faster of the rotation of the rotation of the engine 11 and the rotation of the stator 72 is selectively transmitted to the oil pump 55 through the selection means in the aforementioned structure, and the oil pump 55 is driven by the transmitted rotation.

In the generator 66, when the rotational speed of the rotor 73 relative to that of the stator 72 is the rotational speed of the generator, the rotational speed transmitted to the transmission shaft 19 is the rotational speed of the output shaft 12 from which the rotational speed of the generator 66 is subtracted.

Operation of the Drive System in Ordinary Driving—Third Embodiment

When the engine 11 is operating, the one-way clutch F3 locks under ordinary driving conditions. When a heavy load is added, the rotational speed of the driving gear 56 can be increased by increasing the generator rotational speed according to the load, so that the amount of discharge from the oil pump 55 can be increased.

Operation of the Vehicle in a Motor Driving Mode—Third Embodiment

When the vehicle drives in a motor driving mode in which only the driving motor 25 is operated driven, with the engine 11 being halted, the amount of discharge of the oil pump 55 can be adjusted through the driving gear 56 by controlling the generator rotational speed. At this time, the one-way clutch F3 becomes free, so that the engine 11 can maintain the state in which it is halted.

As in the case when the engine 11 is operating, the amount of discharge of the oil pump 55 can be adjusted through the driving gear 56 by controlling the generator rotational speed according to the load. The rotational speed transmitted to the driving gear 56 is a value of the rotational speed of the driving motor 25 to which the rotational speed of the generator 66 is added, and when the rotational speed to be transmitted to the driving gear 56 is higher than the rotational speed of the driving motor 25, the generator 66 is driven as a motor, and when the rotational speed to be transmitted to the driving gear 56 is lower than the rotational speed of the driving motor 25, the generator 66 is driven as a generator.

Operation When the Vehicle is Halted—Third Embodiment

The amount of discharge of the oil pump 55 can be adjusted by driving the generator 66 as a motor and by controlling its rotational speed. In this case, the rotational speed of the generator 66 is the same as the rotational speed of the driving gear 56.

Operation When the Vehicle Reverses in a Motor Driving Mode—Third Embodiment

The amount of discharge of oil pump 55 can be adjusted by driving the generator 66 as a motor and by controlling its rotational speed. In this case, the driving motor 25 rotates in a reverse direction, so that the generator 66 is also rotated in a reverse direction, and its rotational speed is controlled to be a normal rotation with the rotational speed higher than the rotational speed of the driving motor 25.

The Control System of the Third Embodiment and its Operation

The description of the control system of this third embodiment, which is the same as the control system in the first embodiment, is abbreviated by incorporating the description of the first embodiment. Though the control operation is the same as that in the first embodiment, the change in the generator rotational speed for a given change in the amount of discharge of the oil pump 55 is different compared to the first embodiment.

Fourth Embodiment

Figure 16:
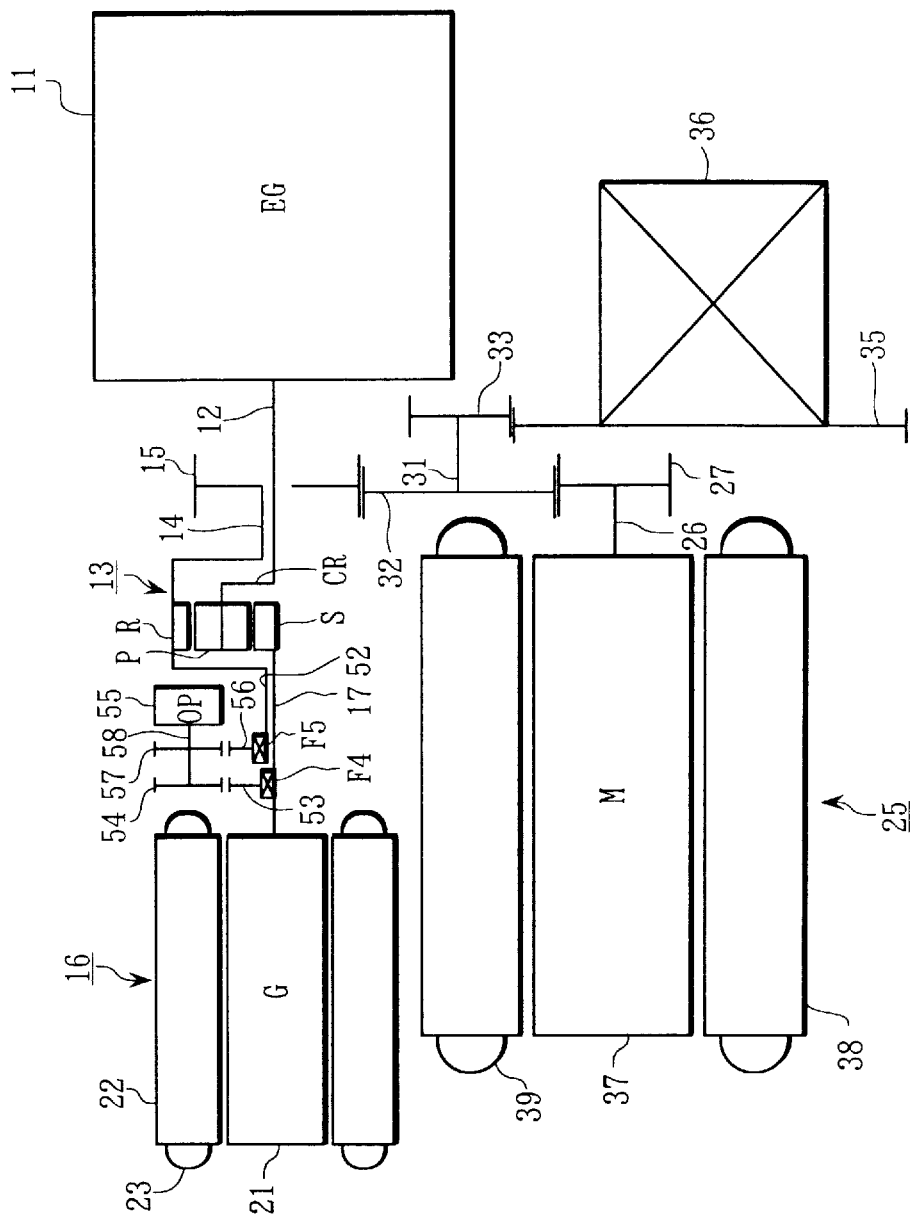
FIG. 16 is a block diagram showing the drive system in the fourth embodiment of the present invention.

FIG. 16 is a block diagram of the drive system of the fourth embodiment. The selection means in this fourth embodiment is provided between the planetary gear unit 13 and the generator 16. The selection means in the fourth embodiment selectively transmits the faster of the rotation transmitted from a sleeve 52, which is a rotational shaft linked to the ring gear R, and the rotation transmitted from the transmission shaft 17 to the oil pump 55. The description of the components other than this selection means is abbreviated by incorporation of the description of the second embodiment, since these other components are the same as those in the aforementioned second embodiment.

The Selection Means—Fourth Embodiment

The selection means in the fourth embodiment includes a first driving gear 53 supported or the transmission shaft 17 with a one-way clutch F4 therebetween, a second driving gear 56 supported on the sleeve 52 with a one-way clutch F5 therebetween, a first driven gear 54 and a second driven gear 57 both of which are fixed to an input shaft 58 of the oil pump 55. The first driving gear 53 is meshed with the first driven gear 54, and the second driving gear 56 is meshed with the second driven gear 57.

The one-way clutch F4 locks when the rotational speed of the first driving gear 53 is lower than the rotational speed of the transmission shaft 17, and the one-way clutch F4 becomes free when the rotational speed of the first driving gear 53 is higher than the rotational speed of the transmission shaft 17. The one-way clutch F5 locks when the rotational speed of the second driving gear 56 is lower than the rotational speed of the sleeve 52, and the one-way clutch F5 becomes free when the rotational speed of the second driving gear 56 is higher than the rotational speed of the sleeve 52. When the one-way clutch F4 is locked, the rotation of the transmission shaft 17 is transmitted from the first driving gear 53 to the oil pump 55 through the first driven gear 54. When the one-way clutch F5 is locked, the rotation of the sleeve 52 is transmitted from the second driving gear 56 to the oil pump 55 through the second driven gear 57.

Accordingly, the faster of the rotation of the first driving gear 53 and that of the second driving gear 56 is transmitted to the input shaft 58, to drive the oil pump 55. In other words, the higher rotational speed as between the rotational speed of the generator 16 connected to the transmission 17 (NG) and the rotational speed of the ring gear R connected to the sleeve 52 (output rotational speed NOUT) is selectively transmitted to drive the oil pump 55.

Operation of the Drive System—Fourth Embodiment

Ordinary Driving—Fourth Embodiment

Under ordinary driving conditions, as shown in FIG. 3(B) and FIG. 4(A), the output rotational speed NOUT which is the rotational speed of the sleeve 52 is higher than the generator rotational speed NG (the rotational speed of the transmission shaft 17), so that the one-way clutch F5 is locked while the one-way clutch F4 becomes free, and the rotation of the sleeve 52 is transmitted to the oil pump 55. Accordingly, the amount of discharge from oil pump 55 increases as the vehicle speed increases.

When a running load is further added, the amount of discharge from the oil pump 55 can be increased by increasing the generator rotational speed NG without changing the vehicle speed.

Operation of the Vehicle in a Motor Driving Mode—Fourth Embodiment

When the vehicle drives in a motor driving mode in which only the driving motor 25 is driven with the engine 11 being halted, the rotation of the driving motor 25 is also transmitted to the sleeve 52 through the counter driven gear 32 and the first counter drive gear 15, so that the one-way clutch F5 is locked while the one-way clutch F4 becomes free, and the rotation of the sleeve 52 is transmitted to the oil pump 55. In this case, the amount of discharge from the oil pump 55 also increases as the vehicle speed increases.

Operation when the Vehicle is Halted—Fourth Embodiment

Figure 17:
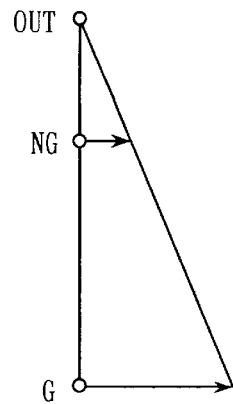
FIG. 17 is a speed diagram for the vehicle with the engine idling in the fourth embodiment of the present invention.

As shown in a speed diagram in FIG. 17, when the engine is idling while the vehicle is halted, the sleeve 52 is halted and the generator 16 is rotating, so that the one-way clutch F4 locks, and the rotation of the generator 16 is transmitted to the oil pump 55. When the engine 11 is not started, the oil pump 55 can be also driven by rotating the generator. In this case, the engine 11 is also rotated at the same time, unlike the cases of the aforementioned first and third embodiments.

The engine 11 can be started by driving the generator 16 as a motor, and at this time, the one-way clutch F4 locks so that the rotation of the generator 16 is transmitted to the oil pump 55.

Operation of the Vehicle in Reverse and in a Motor Driving Mode—Fourth Embodiment When the vehicle reverses, the output rotational speed NOUT in a reverse direction is input to the ring gear R, and the engine 11 is in a non-driving state. At this time, the sleeve 52 connected to the ring gear R rotates in reverse, so that the one-way clutch F5 becomes free. In this case, the amount of discharge from the oil pump 55 can be adjusted by driving the generator 1G as a motor and by controlling its rotational speed NG.

Control System and its Operation—Fourth Embodiment

In the drive system in this fourth embodiment, the adjustment of the amount of discharge from the oil pump 55 is by the control of the rotational speed of the generator 16 when the vehicle is driven ordinarily and when the vehicle reverses. Since the structure and the operation of the control system in this case is the same as those in the first embodiment, the description of the structure and the operation of the control system is abbreviated.

Fifth Embodiment

Structure of the Driving System—Fifth Embodiment

Figure 18:
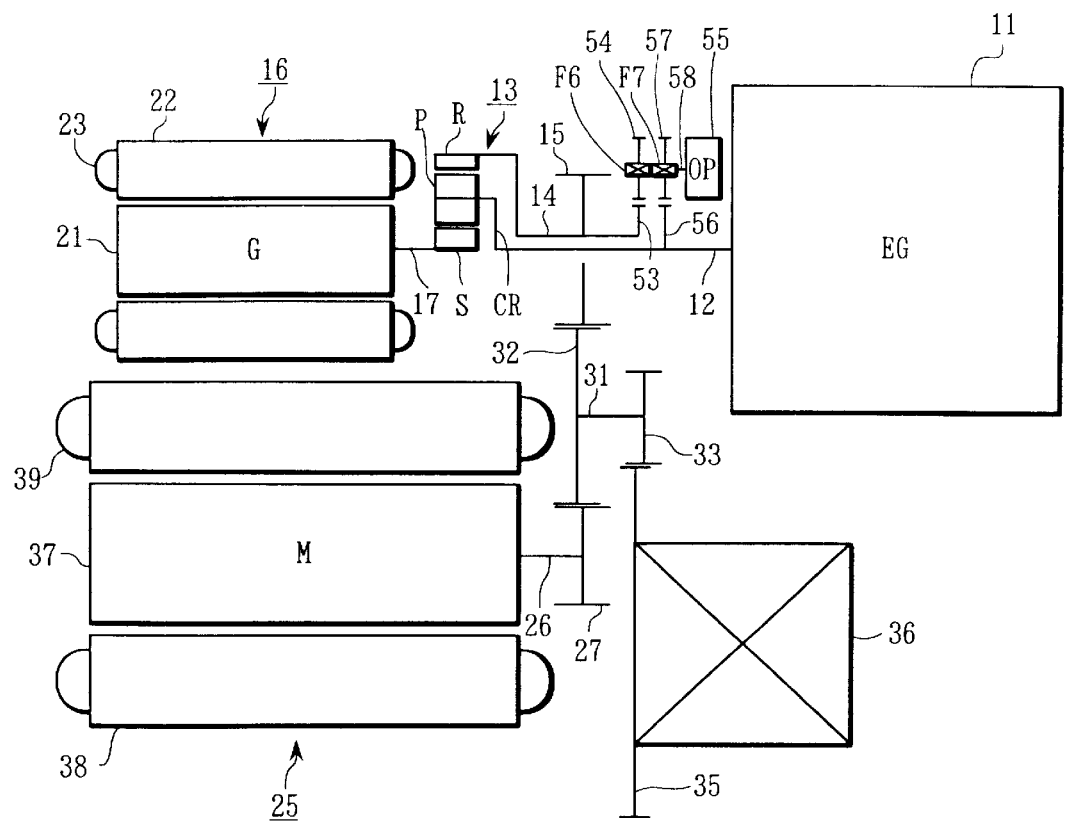
FIG. 18 is a block diagram showing the drive system in the fifth embodiment of the present invention.

FIG. 18 is block diagram of the structure of the drive system of the fifth embodiment. The selection means in this fifth embodiment is provided between the engine 11 and the planetary gear unit 13. The selection means in the fifth embodiment selectively transmits to the oil pump 55 the faster of the rotation transmitted from the unit output shaft 14 and the rotation transmitted from the output shaft 12. The components other than this selection means are the same as those in the aforementioned first embodiment and, therefore, the description of them is abbreviated by incorporation of the description of the first embodiment.

Selection Means—Fifth Embodiment

The selection means in the fifth embodiment includes the first driving gear 53 fixed to the unit output shaft 14, the second driving gear 56 fixed to the output shaft 12, the first driven gear 54 supported on the input shaft 58 of the oil pump 55 through a one-way clutch F6, and the second driven gear 57 supported on the input shaft 58 through a one-way clutch F7. The first driving gear 53 is meshed with the first driven gear 54, and the second driving gear 56 is meshed with the second driven gear 57.

The one-way clutch F6 locks when the rotational speed of the first driven gear 54 is higher than the rotational speed of the input shaft 58 of the oil pump 55, and the one-way clutch F6 becomes free when the rotational speed of the first driven gear 54 is lower than the rotational speed of the input shaft 58 of the oil pump 55. The one-way clutch F7 locks when the rotational speed of the second driven gear 57 is higher than the rotational speed of the input shaft 58 of the oil pump 55, and the one-way clutch F7 becomes free when the rotational speed of the second driven gear 57 is lower than the rotational speed of the input shaft 58 of the oil pump 55.

Accordingly, the faster of the rotation of the first driven gear 54 and that of the second driven gear 57 is transmitted to the input shaft 58 to drive the oil pump 55. In other words, the higher rotational speed as between the rotation of the unit output shaft 14 and the rotation of the output shaft 12 is selectively transmitted to drive the oil pump 55.

Operation of the Drive System—Fifth Embodiment

Ordinary Driving Under ordinary driving conditions, as shown in FIG. 3(B) and FIG. 4(A), the output rotational speed NOUT, which is the rotational speed of the unit output shaft 14, is higher than the engine speed NE (the rotational speed of the output shaft 12), so that the one-way clutch F6 is locked while the one-way clutch F7 becomes free and the rotation of the unit output shaft 14 is transmitted to the oil pump 55. Accordingly, the amount of discharge from the oil pump 55 increases as the vehicle speed increases. When a larger amount of discharge from the oil pump is needed, the amount of discharge from the oil pump can be increased by increasing the engine speed NE to be higher than the output rotational speed NOUT by further increasing the generator rotational speed NG.

Operation of the Vehicle in a Motor Driving Mode—Fifth Embodiment

When the vehicle drives in a motor driving mode in which only the driving motor 25 is driven, with the engine 11 halted, the rotation of the driving motor 25 is also transmitted to the unit output shaft 14 through the counter driven gear 32 and the first counter drive gear 15, so that the one-way clutch F6 is locked and one-way clutch F7 becomes free, and the rotation of the unit output shaft 14 is transmitted to the oil pump 55. In this case, the amount of discharge from the oil pump 55 also increases as the vehicle speed increases.

Operation When the Vehicle is Halted—Fifth Embodiment

When the engine 11 idles while the vehicle is halted, the output shaft 12 is rotating, so that the one-way clutch F7 locks and the rotation of the output shaft 12 is transmitted to the oil pump 55. Even if the engine 11 is not started, the engine 11 and the output shaft 12 can be compulsorily rotated by driving the generator 16 as a motor as shown in FIG. 17. In this case, the one-way clutch F7 locks and the rotation of the output shaft 12 is transmitted to the oil pump 55.

Operation of the Vehicle in Reverse and in a Motor Driving Mode—Fifth Embodiment When the vehicle reverses, the output rotational speed NOUT in a reverse direction is input to the ring gear R, and the engine 11 is not operated. At this time, the unit output shaft 14 rotates in a reverse direction so that the one-way clutch F6 becomes free. In this case, the oil pump 55 can be driven by driving the generator 16 as a motor and by rotating the output shaft 12 linked to the carrier CR as shown in FIG. 7(B). The amount of discharge from this oil pump 55 is adjusted by controlling the rotational speed of the generator 16.

Control System and Operation Thereof—Fifth Embodiment

In the structure of the drive system of this fifth embodiment, the adjustment of the amount of discharge from the oil pump 55 is by controlling the rotational speed of the generator 16 when the vehicle reverses. The structure and operation of the control system in this case are the same as those in the first embodiment and, therefore, their description is abbreviated.

The hybrid vehicle of the present invention is not limited to the aforementioned embodiments.

As has been described, in the hybrid vehicle of the present invention, the amount of discharge from the oil pump can be controlled to a required amount by controlling the generator rotational speed, so that a required amount of lubricant can be supplied to each part of the drive system, and sufficient lubrication and cooling can be secured.

Since the basic amount of discharge from the oil pump can be small, the fuel consumption under ordinary driving conditions can be improved and the lubrication system simplified without need to increase the size of the pump and, therefore, the entire body of the vehicle can be more light and compact.

Furthermore, since the generator is rotated even when the engine is halted, lubricant can be supplied, so that the deterioration of the drive system caused by the shortage of lubricant can be prevented, even with quick start driving and the like.

What is claimed is:

1. A hybrid vehicle comprising:
   an internal-combustion engine for driving an engine output shaft;
   a generator operable at a variable rotational speed based on an instruction signal;
   an electric motor driven by an electric current supplied thereto;
   an unit output shaft connected to drive wheels of the vehicle;
   a differential gear unit comprising at least a first gear element connected to said generator, a second gear element connected to said engine output shaft, and a third gear element connected to said unit output shaft and, through said unit output shaft, to said electric motor;
   an oil pump for lubrication rotatably driven by at least one of said engine output shaft, a transmission shaft connected to said generator, and said unit output shaft; and
   control means for receiving said instruction signal and for controlling amount of discharge from said oil pump by controlling the rotational speed of said generator in accordance with said instruction signal.

2. A hybrid vehicle according to claim 1 wherein said instruction signal corresponds to the detected running load, wherein said hybrid vehicle further comprises load detecting means for detecting a running load of the vehicle, and wherein said control means increases the rotational speed of said generator according to increase of the detected running load.

3. A hybrid vehicle according to claim 2, wherein the running load detected by said load detecting means is detected as at least one of vehicle speed, degree of accelerator opening, a difference between the rotations of right and left wheels, and temperature of said electric motor.

4. A hybrid vehicle according to claim 1, further comprising vehicle start detecting means for detecting start of the vehicle, wherein said control means rotates said generator for a specified time responsive to a detected vehicle start.

5. A hybrid vehicle according to claim 1, wherein said control means rotates said generator when the vehicle is driven by said motor with said internal-combustion engine being halted.

6. A hybrid vehicle according to claim 1, wherein a one-way clutch is provided between said oil pump and said internal-combustion engine.

7. A hybrid vehicle according to claim 6, wherein said one-way clutch includes a primary side member to which the engine output shaft is connected, and a secondary side member to which said second gear element is connected, wherein said hybrid vehicle further comprises a driving gear which is connected to said secondary member and which drives said oil pump, and wherein said one-way clutch locks when said secondary side member transmits power from said internal-combustion engine, and said one-way clutch becomes free for rotation of the secondary member in a reverse direction.

8. A hybrid vehicle according to claim 6, wherein said one-way clutch includes a primary side member to which said first gear element is connected, and a secondary side member to which said transmission shaft is connected, wherein said hybrid vehicle further comprises a driving gear which is connected to said secondary side member and which drives said oil pump, and wherein said one-way clutch locks when the generator rotates in a direction in which the generator receives reaction of said internal-combustion engine, and said one-way clutch becomes free when the generator rotates in a reverse direction.

9. A hybrid vehicle according to claim 1, further comprising selection means for selectively connecting one of two of said shafts for transmitting rotation of the one selectively connected shaft to said oil pump.

10. A hybrid vehicle according to claim 9, wherein said selection means includes a first one-way clutch for selectively connecting one of said two shafts to a pump input shaft for driving said oil pump and a second one-way clutch for selectively connecting the other of said two shafts to the pump input shaft.

11. A hybrid vehicle according to claim 10, wherein the one selectively connected shaft is the one of said two shafts rotating with the higher rotational speed.

12. A hybrid vehicle according to claim 10, wherein said selection means includes a first driving gear connected to the unit output shaft, a first driven gear connected to the pump input shaft and meshed with said first driving gear, a second driving gear connected to said transmission shaft, and a second driven gear connected to the pump input shaft and meshed with said second driving gear, and wherein one of said driving gears and said driven gears is connected to said engine output shaft, the pump input shaft, or the transmission shaft through one of said one-way clutches, and wherein said one one-way clutch locks when rotational speed of said second gear element or rotational speed of the transmission shaft is higher than rotational speed of the pump input shaft.

13. A hybrid vehicle according to claim 12, wherein said first one-way clutch is connected to said first driving gear, and said second one-way clutch is connected to said second driving gear, and wherein rotation of the faster of rotation of said first driving gear and rotation of said second driving gear is transmitted to the pump input shaft.

14. A hybrid vehicle according to claim 10, wherein said selection means includes a first driving gear connected to the unit output shaft, a first driven gear which is connected to the pump input shaft and which is meshed with said first driving gear, a second driving gear connected to the engine output shaft, and a second driven gear which is connected to the pump input shaft and which is meshed with said second driving gear; and wherein one of said driving gears and said driven gears is connected to the engine output shaft, the pump input shaft, or the transmission shaft through one of said one-way clutches, and said one one-way clutch locks when rotational speed of said second gear element or rotational speed of the engine output shaft is higher than rotational speed of the pump input shaft.

15. A hybrid vehicle according to claim 14, wherein said first one-way clutch is connected to said first driven gear, said second one-way clutch is connected to said second driven gear and wherein the faster of rotation of said first driven gear and rotation of said second driven gear is transmitted to the pump input shaft.

16. A hybrid vehicle according to claim 1, wherein said control means causes said generator to rotate as a motor, thereby driving said oil pump through said transmission shaft, when the ignition is turned on.

17. A hybrid vehicle comprising:

an engine output shaft connected to an internal-combustion engine for outputting rotation of the internal-combustion engine;

a generator;

an electric motor, driven by an electric current supplied thereto, for driving a motor output shaft;

a differential gear device consisting of a first gear element which is connected to a transmission shaft driven by said generator, a second gear element which is connected for rotation with said motor output shaft and a third gear element which is connected to said engine output shaft;

an oil pump and an oil pump input shaft for driving said oil pump;

a first one-way clutch for connecting a shaft, which is synchronistically rotated with the motor output shaft, with said oil pump input shaft; and a second one-way clutch for connecting a shaft, which is synchronistically rotated with the engine output shaft, with said oil pump input shaft.

18. The hybrid vehicle according to claim 17, wherein said engine output shaft, said differential gear device and said generator are axially aligned to define a first axis and form drive shaft means for output of a drive rotation, and wherein said hybrid vehicle further comprises a countershaft and a counter driven gear mounted on said countershaft and drivably connected to both of said motor output shaft and said drive shaft means and a differential unit including a dif-ring gear rotatably driven about a second axis by engagement with a dif-pinion gear mounted on said countershaft, and wherein said motor shaft, said countershaft and said second axis are parallel to said first axis.

19. The hybrid vehicle according to claim 18, wherein said drive shaft means is further formed of a unit output shaft and a counter drive gear mounted on said unit output shaft and engaged with said counter driven gear.

20. The hybrid vehicle according to claim 18 wherein said second gear element and said motor output shaft are connected through said counter driven gear.

21. The hybrid vehicle according to claim 18, wherein said first and second one-way clutches are positioned between said engine and said counter drive gear.

* * * * *